(12) United States Patent  (10) Patent No.: US 8,225,988 B1
Bohen et al.  (45) Date of Patent: Jul. 24, 2012

(54) LOAD BALANCING FOR CASH HANDLING DEVICES

(75) Inventors: Daniel Christopher Bohen, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 476 days.

(21) Appl. No.: 12/247,584

(22) Filed: Oct. 8, 2008

(51) Int. Cl.
*G06Q 40/00* (2006.01)
(52) U.S. Cl. .......................................... 235/379; 705/43
(58) Field of Classification Search .................. 705/16, 705/35
See application file for complete search history.

(56) References Cited

U.S. PATENT DOCUMENTS

| | | | |
|---|---|---|---|
| 5,105,364 A * | 4/1992 | Kawamura et al. ........... | 700/219 |
| 5,524,113 A | 6/1996 | Gaddis | |
| 5,787,403 A | 7/1998 | Randle | |
| 6,014,649 A * | 1/2000 | Kobayashi et al. ............. | 705/43 |
| 6,052,721 A | 4/2000 | Shepherd et al. | |
| 6,414,958 B1 | 7/2002 | Specht | |
| 6,553,014 B1 | 4/2003 | Shobatake | |
| 6,554,184 B1 | 4/2003 | Amos | |
| 6,575,359 B1 | 6/2003 | Tramontano | |
| 6,588,664 B2 | 7/2003 | Davies | |
| 6,796,490 B1 | 9/2004 | Drummond et al. | |
| 6,839,731 B2 | 1/2005 | Alexander et al. | |
| 7,000,832 B2 | 2/2006 | Washington et al. | |
| 7,082,464 B2 | 7/2006 | Hasan et al. | |
| 2005/0096986 A1 * | 5/2005 | Taylor et al. .................... | 705/16 |

* cited by examiner

*Primary Examiner* — Thien M. Le
*Assistant Examiner* — Sonji Johnson
(74) *Attorney, Agent, or Firm* — Banner & Witcoff, Ltd; Michael A. Springs (57) ABSTRACT

Methods and devices enable inventory levels to be monitored and controlled across a plurality of networked cash handling devices. A cash handling device may be stocked with inventory. Deposits to and withdrawals from the cash handling device may be made. Changes in the inventory due to the deposits and the withdrawals may be monitored and controlled from a cash handling device or from a remote computer. Inventory in the cash handling devices may be adjusted when at least one threshold for the inventory is reached. Additionally or alternatively, inventory may be dispensed from one or more cash handling devices that have more of a currency denomination than one or more other cash handling devices.

23 Claims, 12 Drawing Sheets

Prior Art

| Event | Current Baseline, Non-Networked, Screen to Recycler Configuration |
|---|---|
| Viewing Device Totals | - See totals in the one recycler |
| Making Deposit | - One deposit sends one transaction with denom totals from one recycler ID downstream |
| Making Withdraw | - One withdrawal occurs as one transaction with denoms from one recycler ID |
| Making Change | - One withdrawal occurs as one transaction with denoms from one recycler ID |
| Register Balancing | - Summation of a user/register total activity from one recycler ID from the time between close to close |
| User Setup/Confirmation | - Updates on one machine |
| Editing User | - Updates on one machine |
| Deleting User | - Updates on one machine |
| Configure Drawer | - Updates on one machine |
| Edit Drawer | - Updates on one machine |
| Delete Drawer | - Updates on one machine |
| Balancing Method | - Updates on one machine |
| Balance Report | - Data from one machine |
| Reconcilation Report | - Data from one machine |
| Transaction Report | - Data from one machine |
| Change Order Report | - Data from one machine |
| User Limits | - Check one machine |
| Target Limits | - Check one machine |
| Min Limit | - Check one machine |
| Max Limit (denom and total) | - Check one machine |
| Store and Forward Limit | - Check one machine |
| Robbery Passcode and Limit | - Applies to one machine and dispenses from one machine when activated |
| Hours of Operation | - Updates on one machine |
| Save Analysis Files | - Data saved from one machine |
| Close Register | - Closes the activity for a user/register on one machine for balancing purposes |
| Transportation Withdraw | - Dispenses from one machine |
| Configure Drums | - Applies to one machine |
| Reset OOS | - Applies to one machine |
| Self Test | - Applies to one machine |

FIG. 6

| Event | Screen to Recycler Configuration for 1:1 |
|---|---|
| Viewing Device Totals | - A new chart showing each recycler as well as grand total |
| Making Deposit | - One deposit may occur with only one machine. This may send one transaction with denomination totals from one recycler ID.<br>- Should a user find that one machine is at capacity they may complete the deposit on the one recycler and then conduct a 2nd deposit transaction on a different recycler.<br>- Each transaction may be associated to one recyclerID and the receipt may be from the printer tied to that recycler |
| Making Withdraw | - Same type logic as above: one transaction with one recycler |
| Making Change | - Same type logic as above: one transaction with one recycler |
| Register Balancing | - Summation of user/register total activity across all networked recyclers |
| User Setup/Confirmation | - Option to apply setup to one, multiple, or all recyclers |
| Editing User | - Updates information wherever the information was previouly located; option to add them to an additional machine |
| Deleting User | - Updates information wherever the information was previouly located; option to choose which machine to delete them from or All |
| Configure Drawer | - Option to apply setup to one, multiple, or all recyclers |
| Edit Drawer | - Updates information wherever the information was previouly located; option to add them to an additional machine |
| Delete Drawer | - Updates information wherever the information was previouly located; option to choose which machine to delete them from or All |
| Balancing Method | - May update all recyclers for a client or location |
| Balance Report | - A new chart showing each recycler as well as grand total |
| Reconcilation Report | - Summation of user/register total activity across networked recyclers for a client or at a location |

FIG. 7A

| Event | Screen to Recycler Configuration for 1:1 |
|---|---|
| Transaction Report | - Default may be to see activity in the one recycler where you are; option to choose one of the other individual machines<br>- Transactions may also be seen for all the recyclers at a client or location<br>- Column may indicate on which recyclerID the activity took place |
| Change Order Report | - See suggested change order for each recycler as well as a total separately<br>- Change orders may be viewed for all the recyclers at a client or location |
| User Limits | - Daily limit applies across all networked recyclers |
| Target Limits | - Target level may be at the network level.<br>- "Load-level balance" may be performed to adjust to target levels across all machines at a client or location. For example, one machine may be over the target while another under the target but the net is that no notes of that denomination need to be withdrawn.<br>- If a dispense is necessary for a denomination, it may come from the cash handling device that would be at the highest % capacity after the dispense. |
| Min Limit | - The one set of min limits and when the networked min limit is reached a warning may be provided. |
| Max Limit (denom and total) | - The one set of max limits and when the networked max limit is reached a warning may be provided. |
| Store and Forward Limit | - Limit applies across all networked recyclers |
| Robbery Passcode and Limit | - Passcode and limit (limit would have to be different for each machine in order to be convincing); may apply across all networked recyclers at a client or location; may dispense from one machine at a time. |
| Hours of Operation | - Applies to all networked recyclers |
| Save Analysis Files | - Data saved from one machine |
| Close Register | - Closes the activity for a user/register across all machines at a client or location for balancing purposes |
| Transportation Withdraw | - May require logging into each screen/recycler to perform the transportation withdraw<br>- May "load-level balance" the withdraw across networked machines at a client or location |
| Configure Drums | - May require logging into each one to configure |
| Reset OOS | - Applies to one machine |
| Self Test | - Applies to one machine |

FIG. 7B

| Event | Screen to Recycler Configuration for 1:Many |
|---|---|
| Viewing Device Totals | - May show each recycler as well as grand total |
| Making Deposit | - One deposit transaction may occur across more than one machine. There may be one receipt that may be the cummulative denom and grand total. The various recyclerIDs may be listed with the deposit.<br>- Should a user find that one machine is at capacity they may simply put the money into another recycler as if all the machine are one unit<br>- Each transaction may be associated to one or more recyclerID - or essentially one unitID - and there may be only one receipt which may list the recyclers used (or the unitID) |
| Making Withdraw | - Same logic as above: one transaction may occur with one or more recyclers acting as one unit<br><br>- Dispensation of the requested denomination may occur from the machine that has the highest % capacity for that denom. Each denom could come from a different machine. The goal is to try to keep the inventory approximately balanced across the machines. |
| Making Change | - Same logic as above: one transaction may occur with one or more recyclers acting as one unit |
| Register Balancing | - Summation of user/register total activity from the unit made up of multiple recyclers |
| User Setup/Confirmation | - Updates to the unit comprised of multiple recyclers |
| Editing User | - Updates to the unit comprised of multiple recyclers |
| Deleting User | - Updates to the unit comprised of multiple recyclers |
| Configure Drawer | - Updates to the unit comprised of multiple recyclers |
| Edit Drawer | - Updates to the unit comprised of multiple recyclers |
| Delete Drawer | - Updates to the unit comprised of multiple recyclers |
| Balancing Method | - Updates to the unit comprised of multiple recyclers |
| Balance Report | - A new chart showing each recycler as well as grand total |

FIG. 8A

| Event | Screen to Recycler Configuration for 1:Many |
|---|---|
| Reconcilation Report | - Summation of user/register total activity from the unit made up of multiple recyclers |
| Transaction Report | - See a total activity total across all recyclers acting as one unit<br>- Column may indicate on which recyclerID the activity took place<br>- Report may be seen on a per machine view |
| Change Order Report | - See a suggested change order across all recyclers acting as one unit |
| User Limits | - Checks the unit comprised of the multiple recyclers |
| Target Limits | - The one set of target limits may still be enough. Dispensation may be performed from one or multiple recyclers to balance the dispense across the unit comprised of multiple recyclers. |
| Min Limit | - The one set of min limits may still be enough since this is a unit |
| Max Limit (denom and total) | - The one set of max limits may still be enough since this is a unit |
| Store and Forward Limit | - Checks the unit comprised of the multiple recyclers |
| Robbery Passcode and Limit | - Applies to unit and dispenses from one or more machines when activated; may want a dispense from multiple machines to be more convincing. |
| Hours of Operation | - Applies to the unit comprised of multiple recyclers |
| Save Analysis Files | - Option provided to select which machine to pull the file |
| Close Register | - Closes the activity for a user/register across the unit made up of multiple machines for balancing purposes |
| Transportation Withdraw | - Logs in and brings unit to target levels by dispensing from the multiple recyclers |
| Configure Drums | - May be configuring the unit<br>- Screen option may be provided where you configure one machine at a time (radio button or list option to select machine) and complete. |
| Reset OOS | - Applies to one machine - may have to select appropriate recycler<br>- One machine out of service does not take the other units out of service. |
| Self Test | - Applies to one machine - may have to select appropriate recycler |

FIG. 8B

LOAD BALANCING FOR CASH HANDLING DEVICES

BACKGROUND

Currently, if more than one cash handling device is required for capacity or redundancy issues, the denominational levels in devices may not stay near target or equal levels. For example, some cash handling devices may be used more frequently, whereas other cash handling devices may be used infrequently.

Manual withdrawals and deposits are required currently in order to move excess notes of a given denomination from one cash handling device to another or to try to equalize denomination levels in different cash handling devices. Consequently, users must log into and interact separately with each cash handling device that is to be monitored or adjusted.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one embodiment, cash handling devices may be networked together. For withdrawals or other requests, the devices may work together in order to provide, for example, currency from the device that holds the greater number of notes for any given denomination. Preferably, dispensing funds from the device that holds the greater number of notes may be accomplished without the user having to interact with or log into each cash handling device.

In another embodiment, a master display may depict a graphical user interface that allows control of a plurality of cash handling devices that are networked together. Alternatively, a display at a local cash handling device may depict a graphical user interface that allows monitoring and/or control of one or more other cash handling devices networked together.

In an embodiment, a plurality of cash handling devices networked together through at least one communication network may be provided. The cash handling devices may be stocked with inventory. Transactions including, but not limited to, withdrawals, deposits, transfers, etc. may be allowed at the cash handling devices. Changes in the inventory in the cash handling devices may be monitored or controlled for the transactions. The inventory in the cash handling devices may be adjusted when at least one threshold for the inventory is reached.

In a further embodiment, one of the cash handling devices may contain more inventory for a given denomination than another cash handling device. Adjustments to inventory may include dispensing the inventory from the cash handling device that has more of the given denomination.

In some embodiments, changes in the inventory in the cash handling devices may be monitored or controlled for the transactions. They may be monitored or controlled from one or more of the cash handling devices. Additionally or alternatively, they may be monitored or controlled from one or more remote computers.

In certain embodiments, inventory may be adjusted to a target level after a threshold for the inventory is reached. One sample threshold is a minimum threshold and may indicate that at least one denomination is at or below a minimum desired level. Another sample threshold is a maximum threshold and may indicate that at least one denomination is at or above a maximum desired level.

In another embodiment, a plurality of networked cash handling devices may be stocked with inventory of a plurality of denominations of currency. Transactions may be allowed at the cash handling devices. When a withdrawal is requested at one of the cash handling devices, a determination may be made as to which of the cash handling devices has a greater number of a denomination. Currency may be dispensed from the cash handling device that has the greater number of the denomination.

In yet another embodiment, a system comprises a plurality of cash handling devices including: processors for executing computer-executable instructions; memories that store the computer-executable instructions; recycling units for storing currency, the recycling units holding different currency denominations; user input means; input mechanisms to receive currency to be deposited; output mechanisms to dispense currency to be withdrawn; scanners to scan currency in order to determine its currency denomination; displays for displaying graphical user interfaces in accordance with the computer-executable instructions; and communication interfaces. The computer-executable instructions cause the cash handling devices to: allow currency to be deposited when requested from the input means; scan the deposited currency in order to determine its denomination; route the deposited currency to one of the recycling units corresponding to the denomination; and allow currency to be withdrawn when requested from the input means. The currency to be withdrawn may be routed from one or more of the cash handling devices that has more of a given denomination than the others or that has more than a certain threshold.

In another embodiment, one or more cash handling devices include one or more smart cassettes. Each smart cassette only includes quantities of denominations to be transferred to another cash handling device. The smart cassette allows currency to be transferred after removal from one cash handling device and insertion into another cash handling device.

In a further embodiment, a system includes a plurality of cash handling devices coupled together, each said device having: a processor for executing computer-executable instructions; memory that stores the computer-executable instructions; recycling units for storing currency, said recycling units holding different first currency denominations; user input means; an input mechanism to receive said currency to be deposited; an output mechanism to dispense said currency to be withdrawn; a scanner to scan said currency in order to determine its said currency denomination; and a communication interface. A single display is coupled to the plurality of cash handling devices. The computer-executable instructions allow the display to monitor and control one or more of the plurality of cash handling devices.

In still another embodiment, the cash handling device may be a cash recycler.

In a further embodiment, the cash handling device may be a deposit only machine.

In still further embodiments, one or more steps may be implemented as computer-executable instructions stored on a computer-readable medium.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

FIG. 6 shows the prior art, current baseline, screen to recycler configuration for a non-networked cash recycler in which one user always interacts with one screen that drives one recycler and one printer.

FIGS. 7A and 7B illustrate sample screen to recycler configurations for a one-to-one implementation where a plurality of cash handling devices are networked together and share data.

FIGS. 8A and 8B illustrate sample screen to recycler configurations for a one-to-many implementation where a plurality of cash handling devices are networked together and share data. However, if desired, a user may interact with a single screen and printer, but the screen may drive one or more of the plurality of cash handling devices.

DETAILED DESCRIPTION

In accordance with various aspects of the disclosure, systems and methods are illustrated for enabling inventory levels to be monitored and/or controlled across a plurality of networked cash handling devices.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers, currency dispensers, depository machines, and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
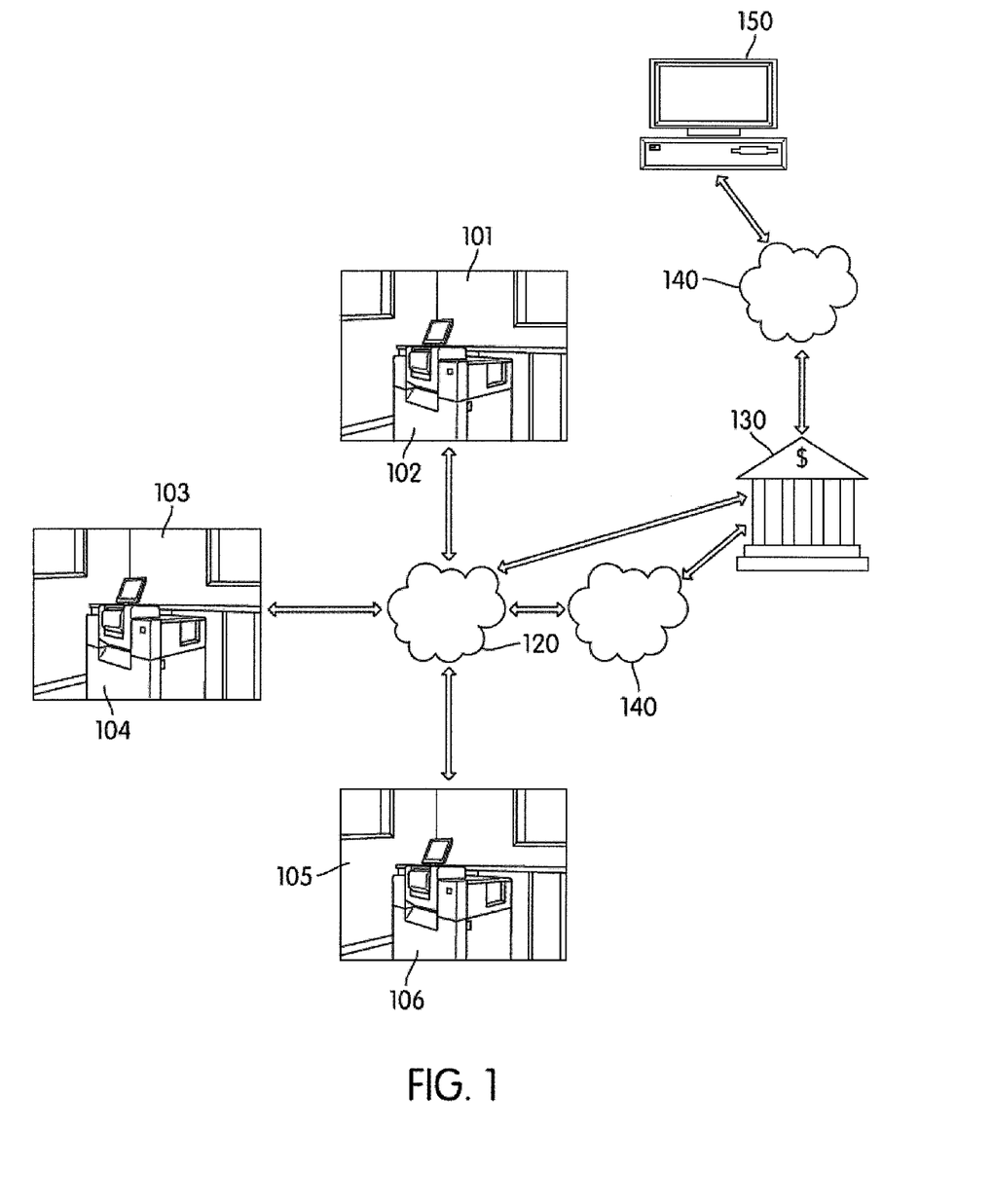
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
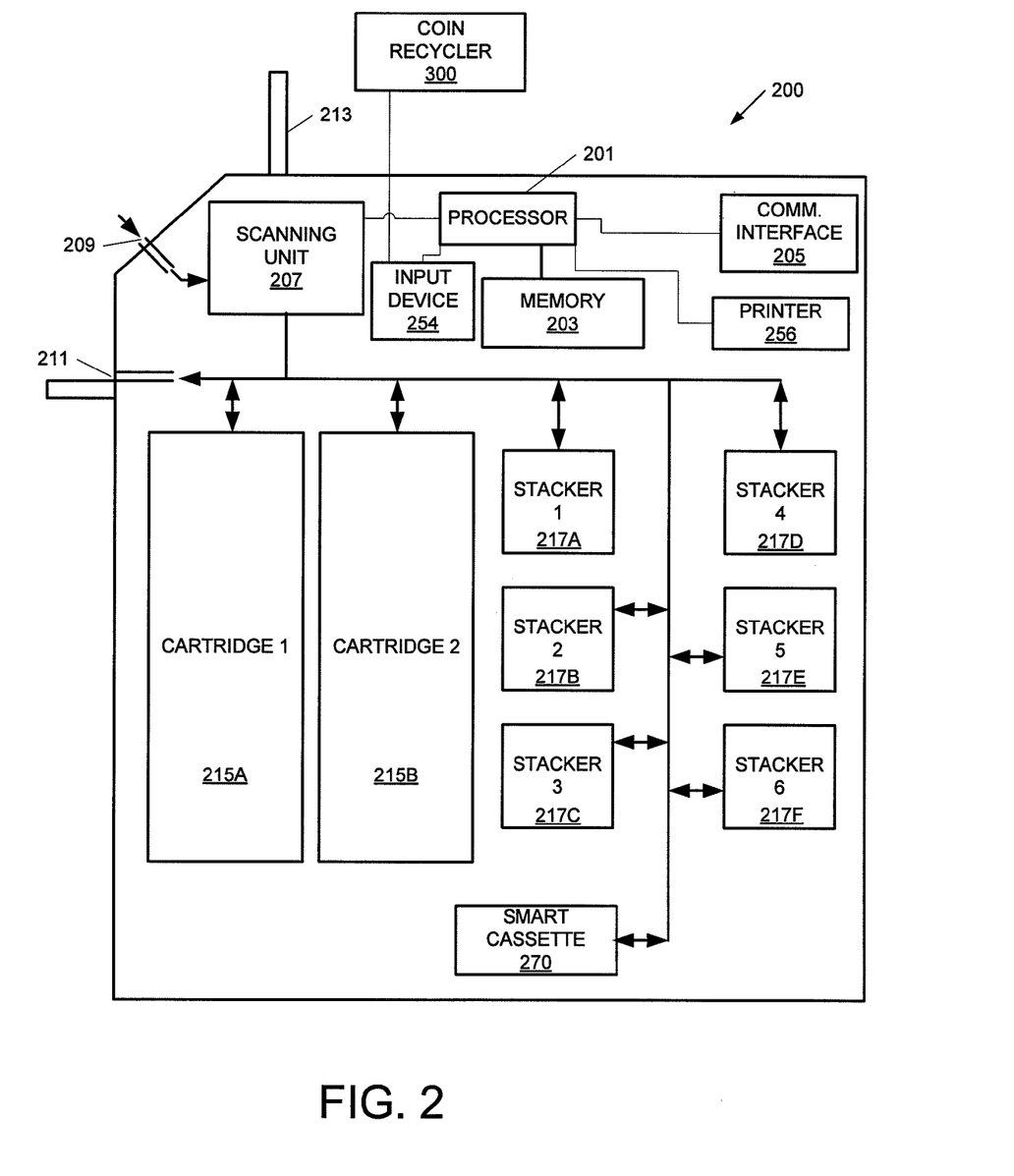
FIG. 2 illustrates a simplified diagram of a cash handling device in accordance with an aspect of the invention.

FIG. 2 illustrates a cash recycler 200 which may further provide display 213 to present data and/or messages to a user. For example, display 213 may be configured to display a recycler balance, a transaction interface, a current deposit count, security options, transportation options and the like.

One or more input devices 254 such as an antenna, serial port, infrared port, Bluetooth module, firewire port, keypad, keyboard, mouse, touchscreen, fingerprint scanner, retinal scanner, proximity card reader, RFID scanner and/or writer, magnetic card reader, barcode reader, and/or combinations thereof may also be included in or connected to recycler 200.

In addition, a coin recycler 300 or other input mechanism to capture non-cash items may also be coupled to the cash handling device 200. The coin recycler 300 may be a stand alone device that is coupled to the cash handling device 200 via one or more of the above-identified input devices 254. This would allow information regarding what coins were deposited into the coin recycler 300 or withdrawn from the coin recycler to be communicated to processor 201 for appropriate crediting, debiting, or other action. In an alternative embodiment, persons of skill in the art will understand that the coin recycler 300 may be integral with and integrated into the cash handling device 200.

One or more printers 256 may also be included in or connected to recycler 200 for printing receipts and notifications as well.

In cash recycler 200, recycling units (also known as stackers, rolled-stored modules, or recycling modules) 217 and cartridges 215 are configured to store currency. One or more stackers 217 or cartridges 215 may also provide storage for overflow currency such as, for example, a larger quantity of one or more denominations that can be physically stored in its stacker 217 or cartridge 215.

Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Preferably, each stacker 217 may be capable of accepting and dispensing a single denomination. Each stacker and any overflow cassette (i.e., for storing overflow quantities of one or more denominations) may be configured with one or more thresholds via a local or remote graphical user interface. Example thresholds include, but are not limited to, a minimum, a maximum, and a target. The thresholds may be assigned arbitrarily or by any desired methodology.

A minimum threshold may be, for example, a calculated lower bill quantity threshold for a given denomination. Once the minimum is reached or approached, the client may be in danger of running out of a specific denomination given historical cash usage patterns.

A target threshold may be the ideal bill quantity for a given denomination. This may be the calculated quantity for a given denomination that may minimize transportation runs given module capacity and historical cash usage patterns.

A maximum threshold may be the calculated upper bill quantity threshold for a given denomination. Once the maximum threshold is reached or approached, the client may be in danger of running out of capacity for a specific denomination given module capacity and historical cash usage patterns.

In an aspect of the invention, the cash handling device 200 may also be connected to a financial institution via communication network 120 (FIG. 1). This may enable the financial institution to monitor and/or control on a real time or periodic basis how much cash, currency, or coins are contained in the cash handling device 200.

Figure 3A:
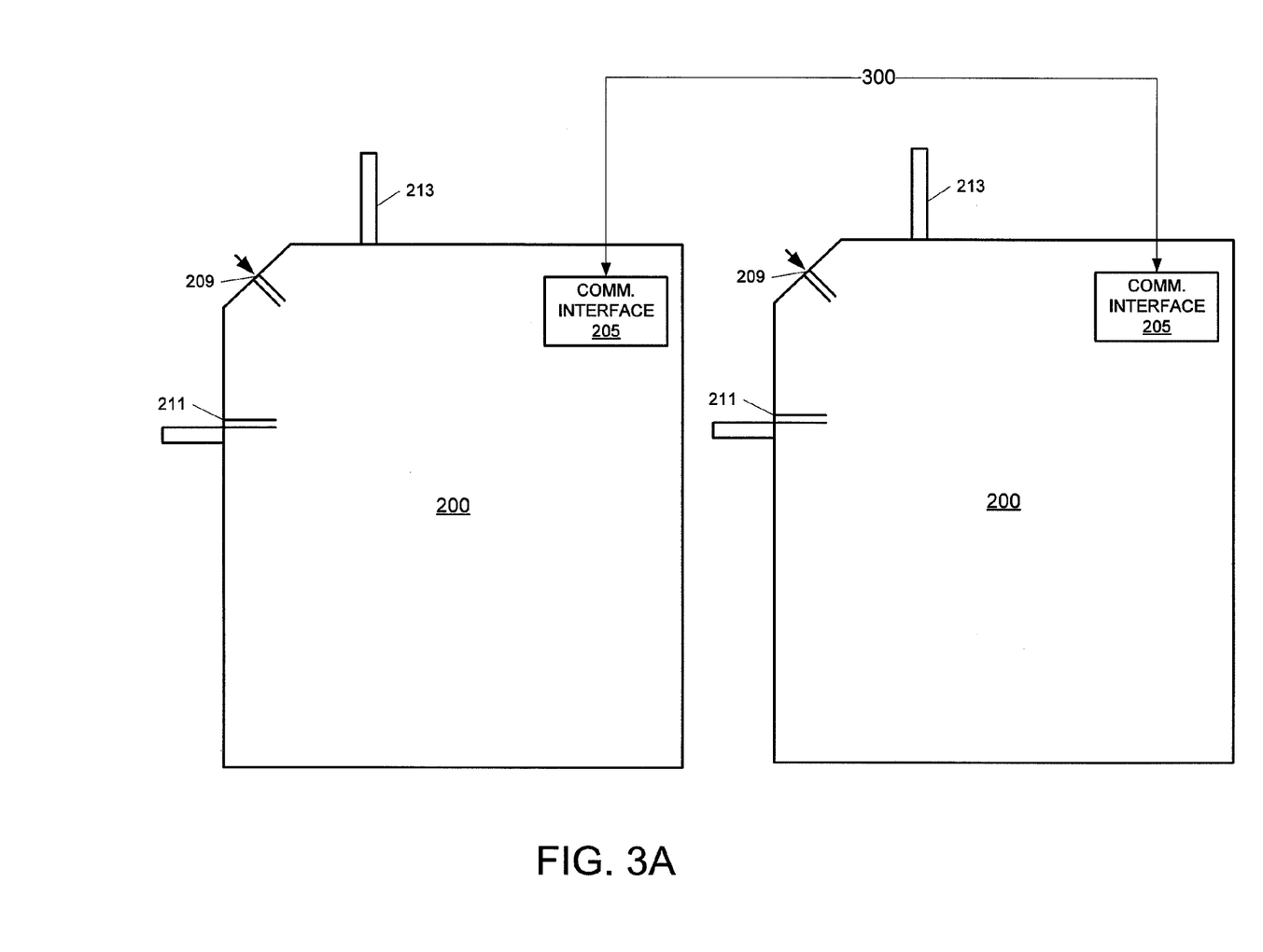
FIG. 3A illustrates an example wherein one or more cash handling devices may be monitored and/or controlled from another cash handling device networked thereto.

FIG. 3A illustrates an example wherein one or more cash handling devices may be monitored and/or controlled from another cash handling device networked thereto. In particular, the communication interfaces 205 of the cash handling devices 200 may be coupled together through one or more communication networks 300.

Figure 3B:
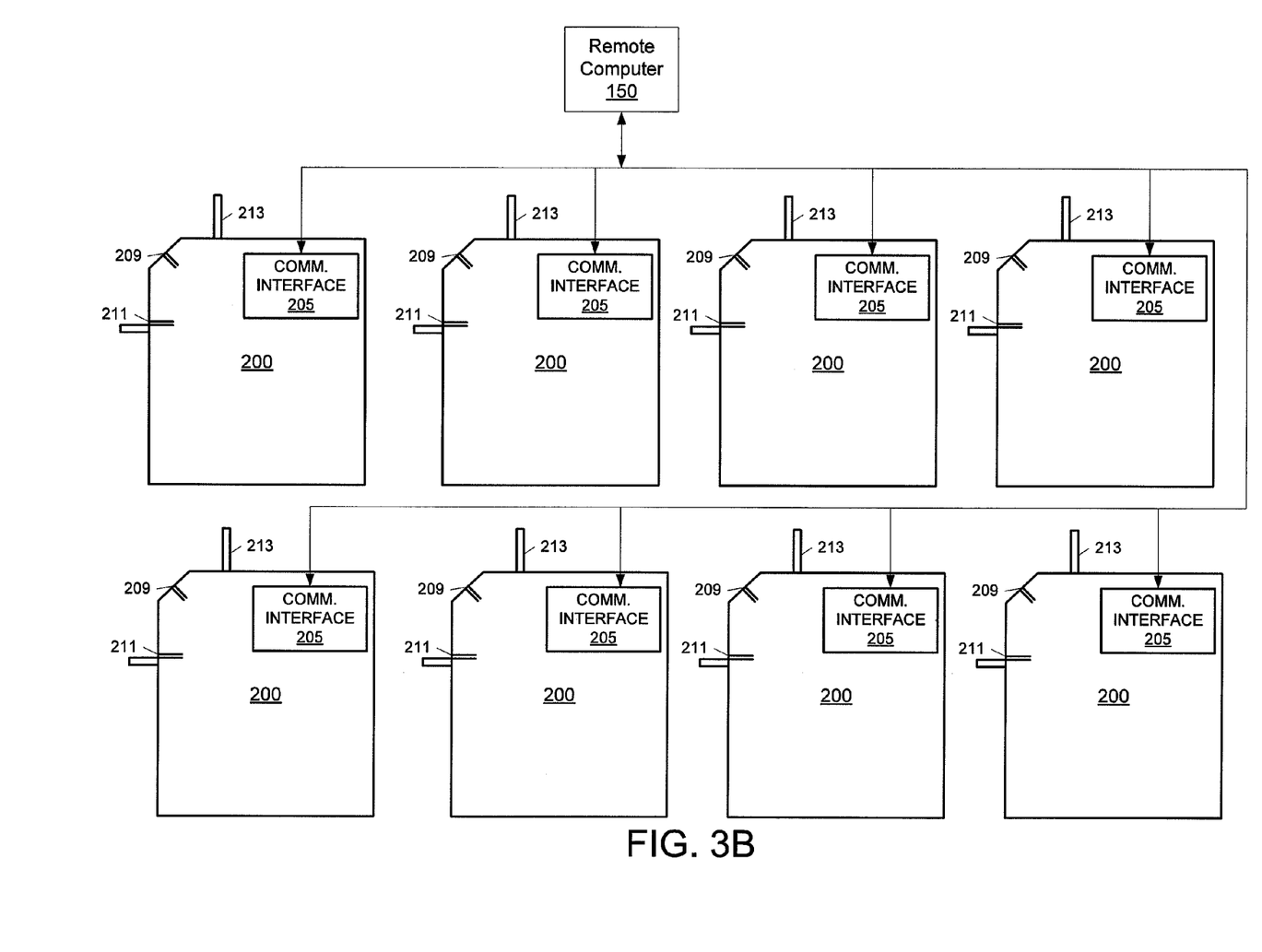
FIG. 3B illustrates an example wherein one or more cash handling devices may be monitored and/or controlled from a computer in communication therewith.

Similarly, FIG. 3B illustrates an example wherein one or more cash handling devices 200 may be monitored and/or controlled from a remote computer 150 such as, for example, at a bank or at a computer located locally at a client's location that is in communication therewith through one or more communication networks 300. The remote computer may be located at the same physical location where one or more of the cash handling devices 200 are located. Alternatively, the remote computer may be located at a location that is separated geographically from one or more of the cash handling devices 200 such as, for example, a bank.

If a withdrawal is requested, inventory may be dispensed from whichever cash handling device has more of a required denomination of currency. The dispensed currency may be output from a common output mechanism or the output mechanism(s) of one or more of the cash handling devices.

Figure 3C:
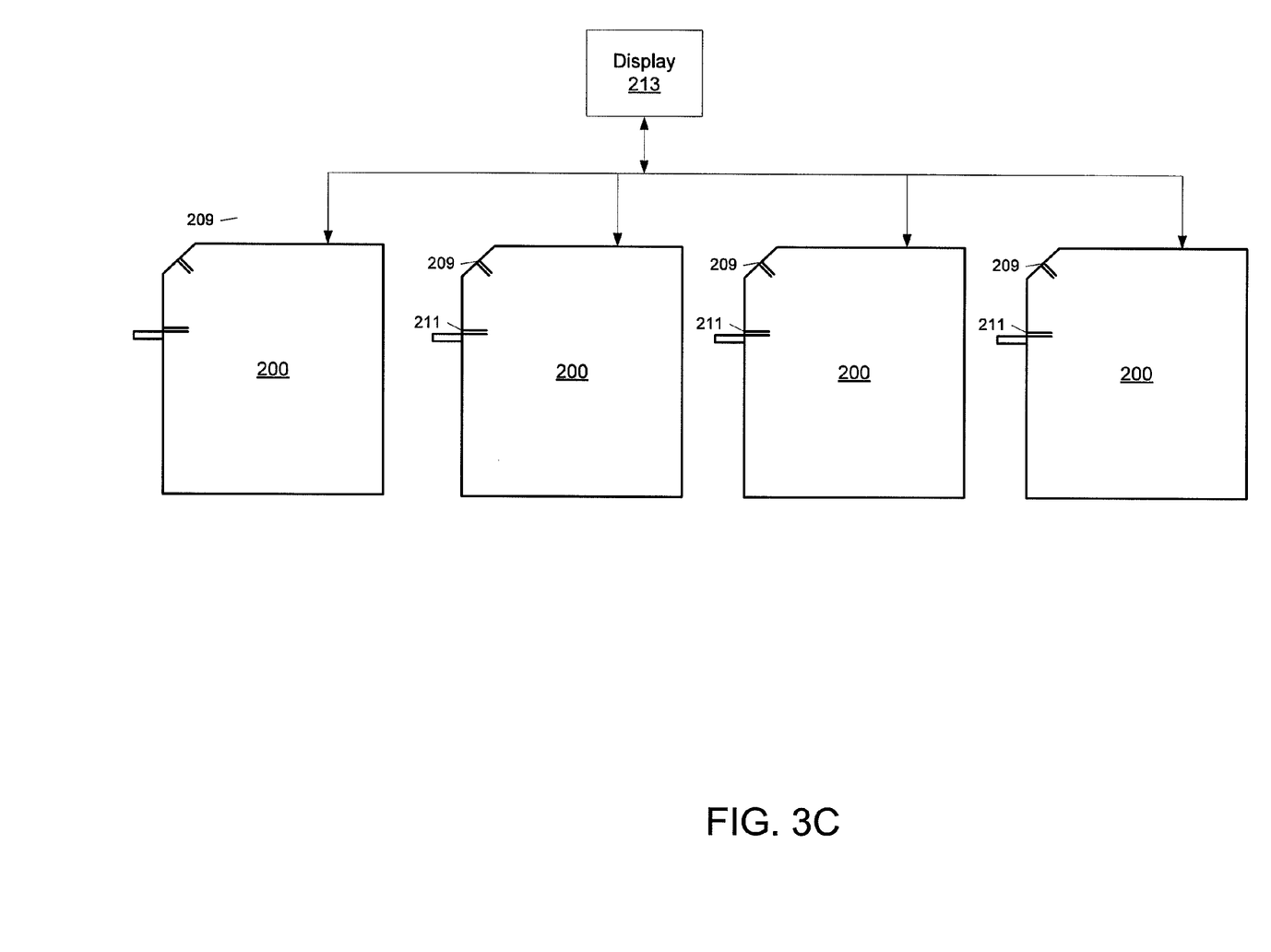
FIG. 3C illustrates an example wherein one or more cash handling devices may share a single display and may be controlled from the graphical user interface thereon.

Another example configuration is shown in FIG. 3C wherein one or more cash handling devices 200 may share a single display 213 and may be controlled from the graphical user interface thereon. In short, this is another configuration in which a single display (either at a cash handling device like shown in FIG. 3B or a shared display like shown in FIG. 3C) may control and/or monitor multiple cash handling devices.

Figure 4:
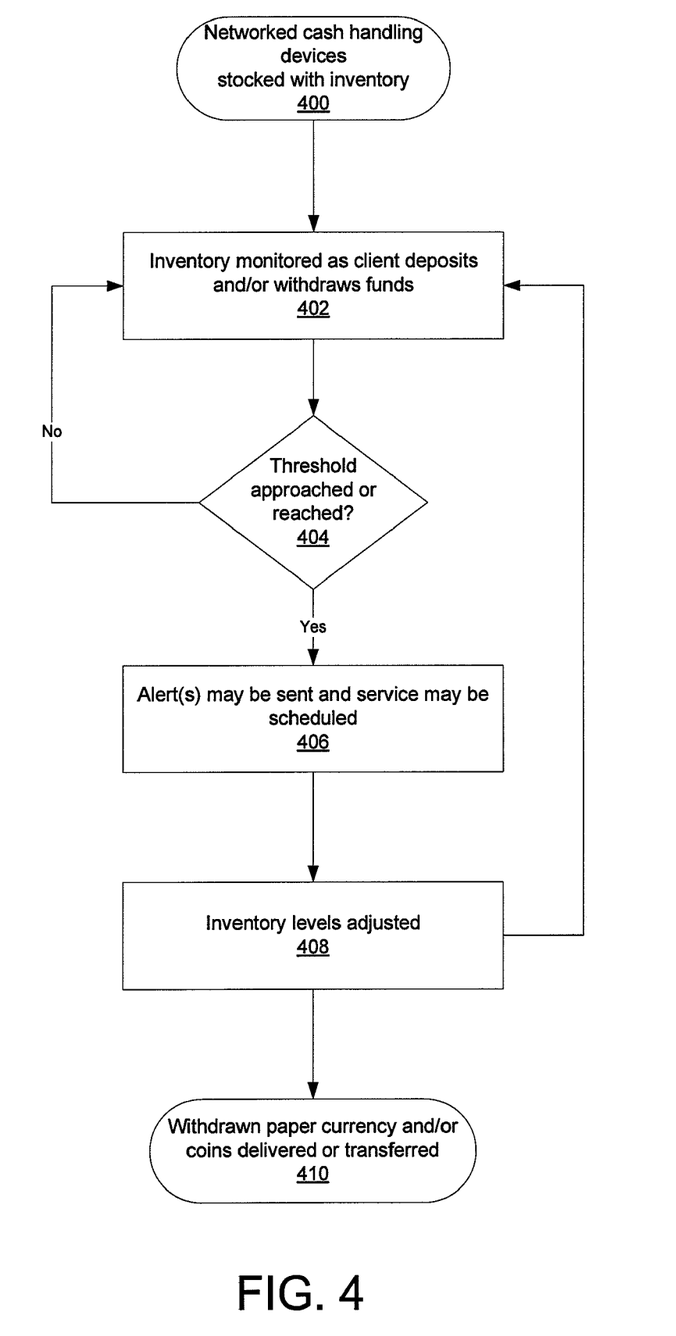
FIG. 4 illustrates an example method of monitoring and/or controlling inventory levels in cash handling devices.

FIG. 4 illustrates an example method of monitoring and/or controlling inventory levels in one or more cash handling devices.

Cash handling devices 200 are stocked initially with inventory 400. Each stacker 217 (FIG. 2)*may* be provided the ideal bill quantity for a given denomination or may be loaded with another predetermined quantity of bills.

Through the normal course of business, a client may deposit into and/or withdraw from the cash handling device 200 various amounts of paper and/or coin currency. This will cause the inventory of various denominations to rise and fall. One or more cash handling devices, banks, remote computers, or other monitoring facilities may monitor the inventory 402 on real time, on a periodic basis, or at other time intervals.

If a minimum or maximum threshold is reached or approached 404, one or more alerts may be sent and/or service may be scheduled 406, if desired. For example, an alert may be sent that requests withdrawal or replenishment of certain denominations. Alternatively or in addition, the alert may request or indicate that the quantity of one or more denominations may be adjusted to target level(s). The alert may be sent to any monitoring facility and/or to a transportation service. Servicing of the cash handling device may be scheduled automatically or manually 406.

Inventory levels may then be adjusted 408. In particular, change order(s) may be issued as a result of one or more alerts. The change order(s) may be delivered to a cash handling device by a transportation service or may be handled locally as transfers by individuals at the client's location. Change orders may be deposited to bring denominations that require replenishment to target or other appropriate levels. Similarly, withdrawals may be performed to decrease excess inventory to target or other appropriate levels. In addition, these change orders may be placed in a central cassette and the machine may route the funds to the appropriate device that requires the notes.

Paper currency and/or coins that are removed from the cash handling device may be transferred to one or more other cash handling devices or returned to a bank facility or other appropriate location 410. Inventory levels may then continue to be monitored or controlled 402 on real time, on a periodic basis, or at other time intervals.

Inventory levels may also be adjusted by use of smart cassettes 270 (FIG. 2) that are self balancing and/or that may be moved from one cash handling device to another. In addition to monitoring and/or controlling inventory for a specific cash handling device, inventory levels may be monitored and/or controlled for all cash handling devices assigned to a client or at a certain location. If desired, cartridges 215A or 215B may be the smart cassette 270. Alternatively, the smart cassette 270 may be a separate module.

Smart cassettes 270 may be used, for example, during transportation carrier runs. In particular, the smart cassettes 270 enable the networked cash handling devices 200 to act together as a combined unit. Consequently, the carrier may not remove inventory from one cash handling device in order to reach its target level(s) if another cash handling device is low on funds.

In addition, inventory levels may be adjusted during any normal service visits by a transportation carrier as well.

Figure 5:
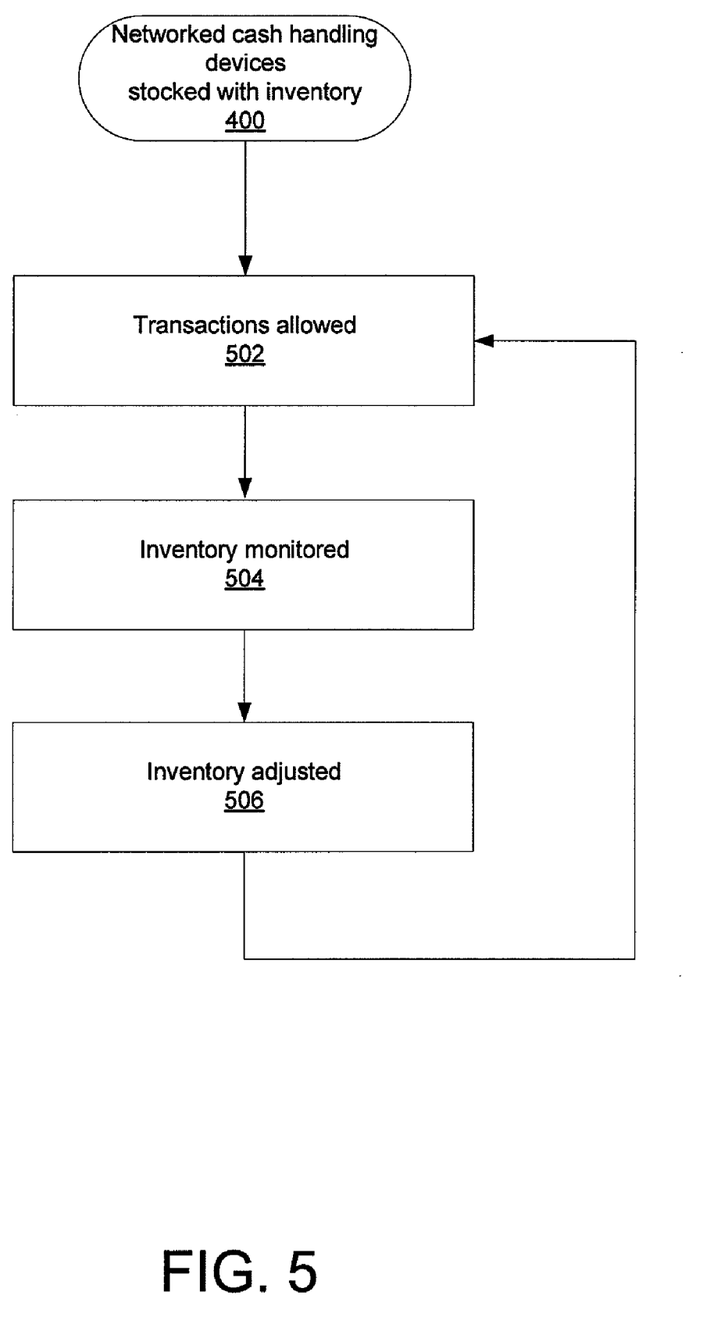
FIG. 5 illustrates another sample method of monitoring and/or controlling inventory levels in cash handling devices.

FIG. 5 illustrates another sample method of monitoring and/or controlling inventory levels in cash handling devices.

Networked cash handling devices are stocked with inventory 400. Transactions such as, for example, withdrawals, deposits, transfers, etc. are allowed 502. Inventory in the cash handling devices may be monitored and/or controlled 504 at specific times, periodically, continuously, or on a real time basis. Inventory may be adjusted 506 as appropriate in order to increase the quantities of various denominations above a minimum level, to decrease the quantities of various denominations below a maximum level, to try to equalize the quantity of various denominations across various cash handling devices, and/or to try to make each cash handling device have quantities of various denominations that approximate the desired target levels.

FIG. 6 shows the prior art, current baseline, screen to recycler configuration for a non-networked cash recycler. As illustrated in the table of FIG. 6., one user will always interact with one screen. The one screen for a cash handling device will only drive the one recycler and one printer attached to the cash handling device.

Consequently, the prior art does not allow inventory levels to be monitored and/or controlled for a plurality of networked cash handling devices. Neither does the prior art allow load balancing to be achieved across a networked cash handling devices.

In contrast, FIGS. 7A and 7B illustrate sample screen to recycler configurations for a one-to-one implementation where a plurality of cash handling devices are networked together and share data. In this situation, a user may interact with one of many screens and/or printers associated with individual cash handling devices. This is desirable for efficiency purposes when, for example, numerous users are present. Each screen may only drive its own cash handling device; however, data may be shared amongst the networked cash handling devices. Sample purposes for which data may be shared include, but are not limited to, personal limits, reporting, minimum targets, maximum targets, etc.

In this type of one-to-one situation where there is a single interface for each device, all the machines may be used at the same time by different users. In that instance, the devices behave like independent devices because money and transactions only occur from each device. However, one user may be logged in and the transactions and money can be pulled not only from the device attached to the interface but also from any other networked devices. Preferably, another user may be allowed to use any open if it is not actively processing funds. At that point the devices may revert back to acting like independent devices until one or more of the users log out.

FIGS. 8A and 8B illustrate sample screen to recycler configurations for a one-to-many implementation where a plurality of cash handling devices are networked together and share data. In essence, the present invention enables the user to interact a single screen and printer, but the screen may drive one or more of the plurality of cash handling device as if they are one large unit comprised of multiple cash handling devices.

In this type of one-to-many situation where one interface may be used for all of the devices, preferably only one user is logged in at a time and all the devices act as one unit in its load balancing behaviors.

Thus, the present invention enables inventory levels to be monitored and/or controlled for a plurality of networked cash handling devices. This allows load balancing to be achieved.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
   providing a plurality of cash handling devices networked together through at least one communication network;
   stocking the cash handling devices with inventory;
   enabling, by a computer system, transactions at the cash handling devices;
   monitoring, by the computer system, changes in the inventory in the cash handling devices as a result of the transactions;
   adjusting, by the computer system, the inventory in the cash handling devices when at least one threshold for the inventory is reached for one of a plurality of currency denominations; and
   equalizing the plurality of currency denominations across the plurality of cash handling devices when the inventory at each of the plurality of cash handling machines is above a minimum level and below a maximum level.

2. The method of claim 1, wherein the equalizing comprises:
when a first cash handling device of said plurality of cash handling devices contains more said inventory than a second cash handling device of said plurality of cash handling devices, the adjusting the inventory includes dispensing the inventory from said first cash handling device of the plurality of cash handling devices; and
when the second cash handling device contains more said inventory than the first cash handling device, the adjusting includes dispensing the inventory from the second cash handling device.

3. The method of claim 2 wherein the changes in the inventory are monitored from a remote location through said at least one communication network.

4. The method of claim 3 wherein the changes in the inventory are controlled from a remote location through said at least one communication network.

5. The method of claim 2 wherein the changes in the inventory are monitored from one of said plurality of cash handling devices through said at least one communication network.

6. The method of claim 5 wherein the changes in the inventory are controlled from one of said plurality of cash handling devices through said at least one communication network.

7. The method of claim 2 wherein the inventory is adjusted to a target level after said at least one threshold for the inventory is reached.

8. The method of claim 7 wherein said at least one threshold is a minimum threshold and indicates that at least one denomination is at or below a minimum desired level.

9. The method of claim 8 wherein said at least one threshold is a maximum threshold and indicates that at least one denomination is at or above a maximum desired level.

10. The method of claim 2 wherein the transactions include deposits to and withdrawals from one of the plurality of cash handling devices.

11. The method of claim 1, further comprising:
preventing removal of first inventory from a first cash handling machine when second inventory at a second cash handling machine is less than a predetermined amount.

12. A method comprising:
stocking a plurality of networked cash handling devices with inventory of a plurality of denominations of currency;
enabling, by a computer system, transactions at the plurality of networked cash handling devices;
determining, by the computer system, when a withdrawal is requested at one of the plurality of networked cash handling devices, which of the cash handling devices has a greater number of a denomination, wherein the denomination is one of the plurality of denominations of currency; and
dispensing currency from another of the plurality of cash handling devices that has the greater number of the denomination when said one of the plurality of cash handling devices has sufficient currency for the withdrawal.

13. The method of claim 12 further comprising monitoring the transactions from a remote location through a communication network that connects the plurality of networked cash handling devices.

14. The method of claim 13 wherein the transactions include deposits, withdrawals, and transfers.

15. The method of claim 12 further comprising monitoring the transactions from one of said plurality of cash handling devices through a communication network that connects the plurality of networked cash handling devices.

16. The method of claim 15 wherein the transactions include deposits and withdrawals.

17. A system comprising:
a first cash handling device including:
a first processor for executing first computer-executable instructions;
a first memory that stores the first computer-executable instructions;
first recycling units for storing first currency, said first recycling units holding different first currency denominations;
first user input means;
a first input mechanism to receive said first currency to be deposited;
a first output mechanism to dispense said first currency to be withdrawn;
a first scanner to scan said first currency in order to determine its said first currency denomination;
a first display for displaying a first graphical user interface in accordance with the first computer-executable instructions; and
a first communication interface;
wherein the first computer-executable instructions cause the first cash handling device to:
enable said first currency to be deposited when requested from the first input means;
scan the first deposited currency in order to determine its said first denomination;
route the first deposited currency to one of said first recycling units corresponding to the first denomination;
enable said first currency to be withdrawn when requested from the first input means; and
a second cash handling device including:
a second processor for executing second computer-executable instructions;
a second memory that stores the second computer-executable instructions;
second recycling units for storing second currency, said second recycling units holding different second currency denominations;
second user input means;
a second input mechanism to receive said second currency to be deposited;
a second output mechanism to dispense said second currency to be withdrawn;
a second scanner to scan said second currency in order to determine its said second currency denomination;
a second display for displaying a second graphical user interface in accordance with the second computer-executable instructions; and
a second communication interface in communication with the first communication interface;
wherein the second computer-executable instructions cause the second cash handling device to:
enable said second currency to be deposited when requested from the second input means;
scan the second deposited currency in order to determine its said second denomination;
route the second deposited currency to one of said second recycling units corresponding to the second denomination;
enable said second currency to be withdrawn when requested from the second input means; and
wherein, when cash inventory is sufficient at the first cash handling machine and the second cash handling machine, the currency to be withdrawn is routed from one of the first recycling units of the first cash handling machine if a first quantity of the first currency denomination at the first cash handling machine exceeds a second quantity of the second currency denomination at the second handling machine, and the currency to be withdrawn is routed from one of the second recycling units of the second cash handling machine if the second quantity of the second currency denomination at the second cash handling machine exceeds the first quantity of the first currency denomination at the first cash handling machine.

18. The system of claim 17 wherein the first graphical user interface allows monitoring and control of the first cash handling device and the second cash handling device, and the second graphical user interface allows monitoring and control of the first cash handling device and the second cash handling device.

19. The system of claim 17 wherein the first cash handling device includes a smart cassette, the smart cassette only including quantities of transfer denominations to be transferred to the second cash handling device, the smart cassette allowing currency to be transferred after removal from the first cash handling device and insertion into the second cash handling device.

20. The system of claim 17 further comprising a remote computer including:
   a remote computer processor for executing remote computer-executable instructions;
   a remote computer memory that stores the remote computer-executable instructions;
   remote user input means;
   a remote display for displaying a remote graphical user interface in accordance with the remote computer-executable instructions; and
   a remote communication interface in communication with said first communication interface and said second communication interface;
   wherein the remote graphical user interface allows monitoring and control of the first cash handling device and the second cash handling device.

21. The system of claim 20 wherein the first recycling units and the second recycling units are configured with lower bill quantity thresholds, target thresholds, and maximum thresholds.

22. A non-transitory computer-readable storage medium storing computer-executable instructions that, when executed, cause a processor at least to perform operations comprising:
   communicating with a plurality of networked cash handling machines;
   monitoring changes in inventory for the plurality of networked cash handling devices as a result of transactions;
   adjusting the inventory at the plurality of networked cash handling devices when at least one threshold for one of the plurality of currency denominations is reached; and
   equalizing the plurality of currency denominations across the plurality of cash handling devices when the inventory at each of the plurality of cash handling machines is above a minimum level and a maximum level.

23. The computer-readable medium of claim 22, wherein the computer-executable instructions, when executed, cause the processor to perform:
   determining when a withdrawal is requested at one of the plurality of networked cash handling devices, which of the cash handling devices has a greater number of notes of said one denomination; and
   dispensing currency from said one of the plurality of networking cash handling devices that has the greater number of notes.

* * * * *